(12) United States Patent  
Liao et al.

(10) Patent No.: US 9,081,543 B2  
(45) Date of Patent: Jul. 14, 2015

(54) DOCKING DEVICE AND PORTABLE PROJECTOR

(75) Inventors: Chien-Chao Liao, Taichung (TW); Deng-Ke Guo, Taichung (TW); Chang-Yi Huang, Taichung (TW)

(73) Assignee: Asia Optical Co., LTD., Tortola, B.V.I. (GB)

( * ) Notice: Subject to any disclaimer, the term of this patent is extended or adjusted under 35 U.S.C. 154(b) by 227 days.

(21) Appl. No.: 13/606,399

(22) Filed: Sep. 7, 2012

(65) Prior Publication Data

US 2013/0182194 A1 Jul. 18, 2013

(30) Foreign Application Priority Data

Jan. 17, 2012 (TW) ............................. 101101802 A

(51) Int. Cl.

| | |
|---|---|
| *G03B 21/14* | (2006.01) |
| *H04N 5/64* | (2006.01) |
| *G06F 13/00* | (2006.01) |
| *H05K 7/00* | (2006.01) |
| *H05K 5/00* | (2006.01) |
| *G06F 1/16* | (2006.01) |
| *H01R 35/04* | (2006.01) |
| *H01R 33/94* | (2006.01) |
| *H04M 1/02* | (2006.01) |
| *H04M 1/06* | (2006.01) |
| *G03B 21/54* | (2006.01) |
| *H04M 1/725* | (2006.01) |

(52) U.S. Cl.

CPC .............. *G06F 1/1632* (2013.01); *G03B 21/14* (2013.01); *G03B 21/54* (2013.01); *H01R 33/94* (2013.01); *H01R 35/04* (2013.01); *H04M 1/021* (2013.01); *H04M 1/0235* (2013.01); *H04M 1/0254* (2013.01); *H04M 1/0272* (2013.01); *H04M 1/06* (2013.01); *H04M 1/72575* (2013.01)

(58) Field of Classification Search
CPC ...... G06F 1/1632; H01R 35/04; H01R 33/94; H04M 1/021; H04M 1/0254; H04M 1/0272; H04M 1/72575; H04M 1/0235; H04M 1/06; G03B 21/14; G03B 21/54
USPC ........... 353/119, 122; 348/744, 788; 710/303; 361/728, 679.41
See application file for complete search history.

(56) References Cited

U.S. PATENT DOCUMENTS

| | | | |
|---|---|---|---|
| 7,372,447 B1 | 5/2008 | Jacobsen et al. | |
| 2005/0265569 A1* | 12/2005 | Langberg et al. | 381/334 |
| 2007/0247794 A1* | 10/2007 | Jaffe et al. | 361/681 |
| 2010/0062615 A1* | 3/2010 | Prest | 439/38 |
| 2011/0164375 A1* | 7/2011 | Hayashida et al. | 361/679.41 |

FOREIGN PATENT DOCUMENTS

CN 2620936 6/2004

* cited by examiner

*Primary Examiner* — Toan Ton  
*Assistant Examiner* — Magda Cruz  
(74) *Attorney, Agent, or Firm* — Tracy M Heims; Apex Juris, pllc

(57) ABSTRACT

A docking device for connecting an electronic device includes a base and a connector. The connector has a body and a connecting port on the base. The body is provided on the base to be moved between a first position and a second position. The connecting port is hidden in the base when the body is moved to the first position, and the connecting is exposed to connect the electronic device when the body is moved to the second position. The docking device may be incorporated in a portable projector.

7 Claims, 8 Drawing Sheets

DOCKING DEVICE AND PORTABLE PROJECTOR

BACKGROUND OF THE INVENTION

1. Field of the Invention

The present invention relates generally to an electronic device, and a docking device and a portable projector.

2. Description of the Related Art

As the improvement of technology, electronic devices are designed for light-weight and portable. Therefore, more and more adapter designed to connect the electronic devices for charging, data transmission, and image output are appearing in the market.

The conventional adapter is connected to the electronic device through a cable to charge, transmit data and output images. Sometime, however, people lost the cable or left it at home so that the adapter is unable to connect the electronic device.

U.S. Pat. No. 7,372,447 taught a docking system for a phone which directly is provided with a connecting port to connect the electronic device. This design overcomes the cable problem as described above. However, the connecting port is exposed all the time so that it may be damaged unexpectedly when user put it in a bag or in pocket.

In conclusion, the conventional device still needs to be improved.

SUMMARY OF THE INVENTION

The primary objective of the present invention is to provide a docking device and a portable projector, which has an integrated connecting port without the cable problem as described above.

According to the objective of the present invention, the present invention provides a docking device for connecting an electronic device, which includes a base and a connector. The connector has a body and a connecting port on the base. The body is provided on the base to be moved between a first position and a second position. The connecting port is hidden in the base when the body is moved to the first position, and the connecting is exposed to connect the electronic device when the body is moved to the second position.

In an embodiment, the present invention provides a portable projector to receive image signals from an electronic device to project images on a screen. The portable projector includes a base, a connector and a projection module. The connector has a body and a connecting port on the base. The body is provided on the base to be moved between a first position and a second position. The connecting port is hidden in the base when the body is moved to the first position; and the connecting is exposed to connect the electronic device when the body is moved to the second position. The projection module is provided in the base and is electrically connected to the connecting port to receive the image signals of the electronic device through the connecting port and project images on the screen consequently.

In an embodiment, the base has a slot; the connecting port is received in the slot when the body is moved to the first position, and the connecting port leaves the slot when the body is moved to the second position.

In an embodiment, the body is pivoted on the base to rotate between the first position and the second position.

In an embodiment, the base has a pair of rails, and the body has a pair of guiding members to engage the rails so that the body reciprocates along the rail between the first position and the second position.

Therefore, the design of the present invention, it may enhance the portability and operation of the docking device and the portable projector without the cable problem as described above.

DETAILED DESCRIPTION OF THE INVENTION

Figure 1:
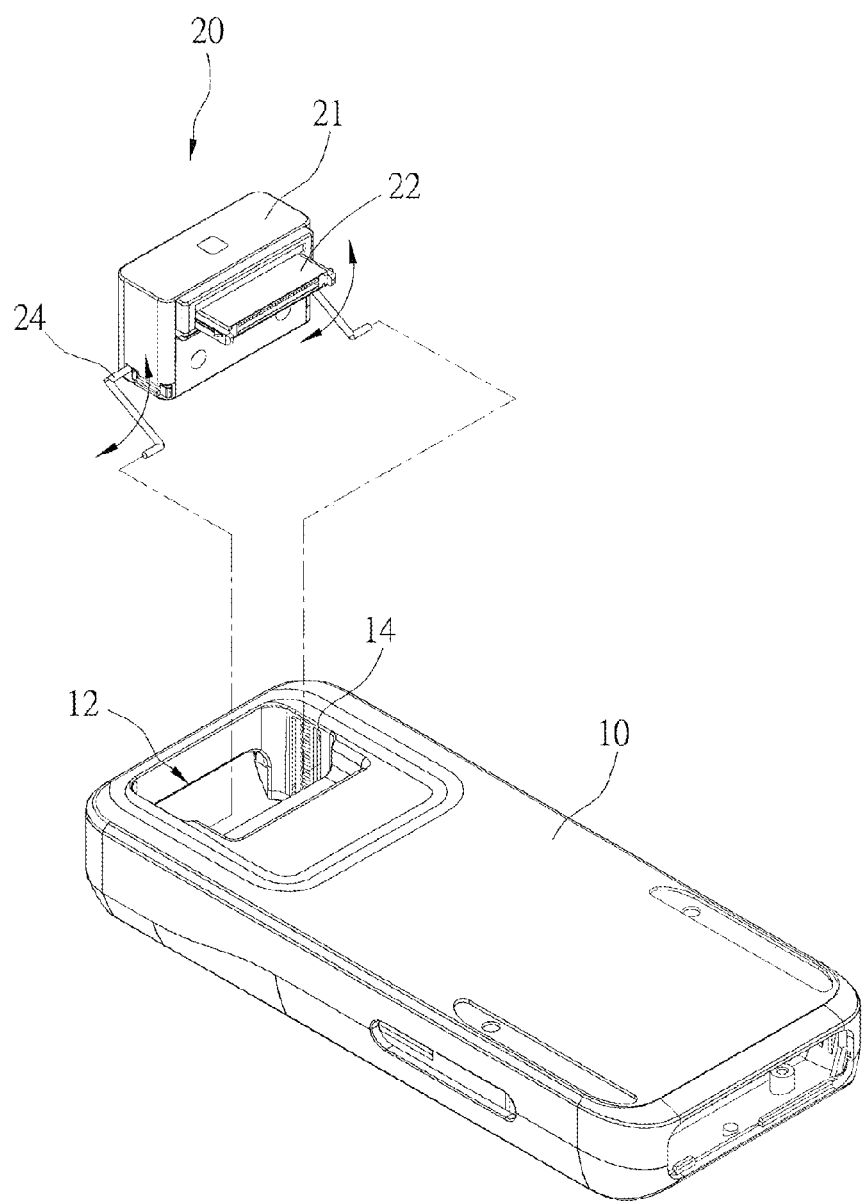
FIG. 1 is a perspective view of a first preferred embodiment of the present invention.
Figure 2:
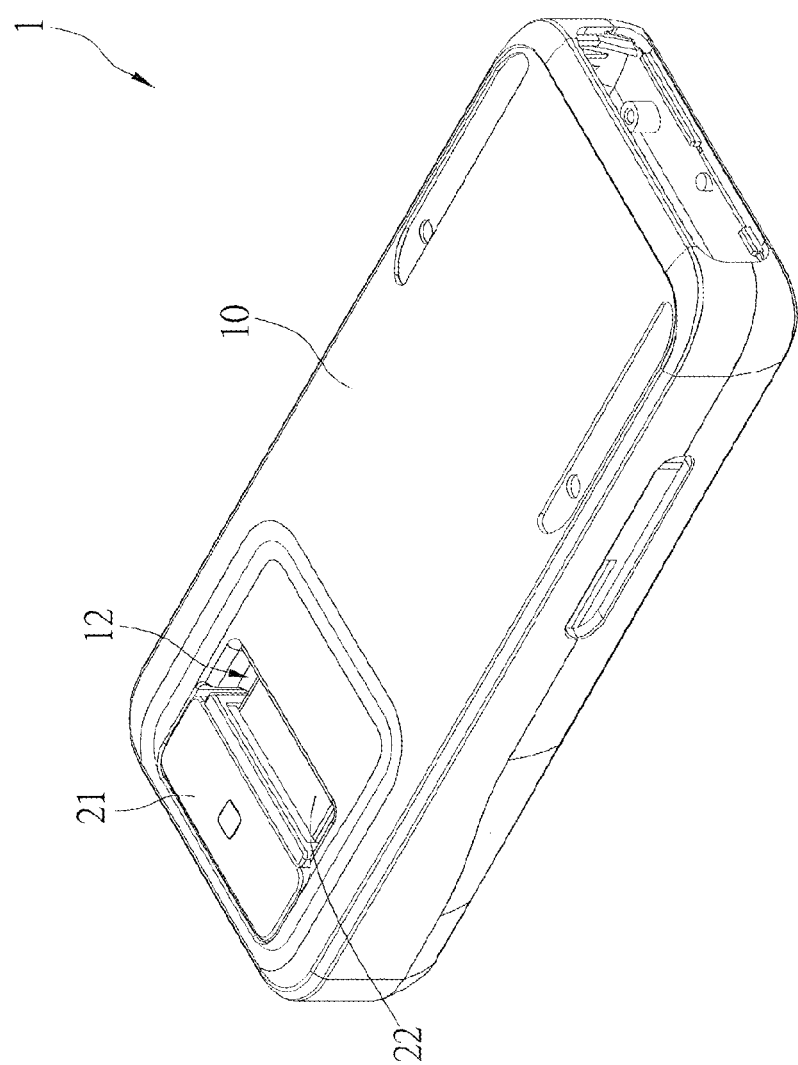
FIG. 2 is a perspective view of the first preferred embodiment of the present invention, showing the connector in the first position.
Figure 3:
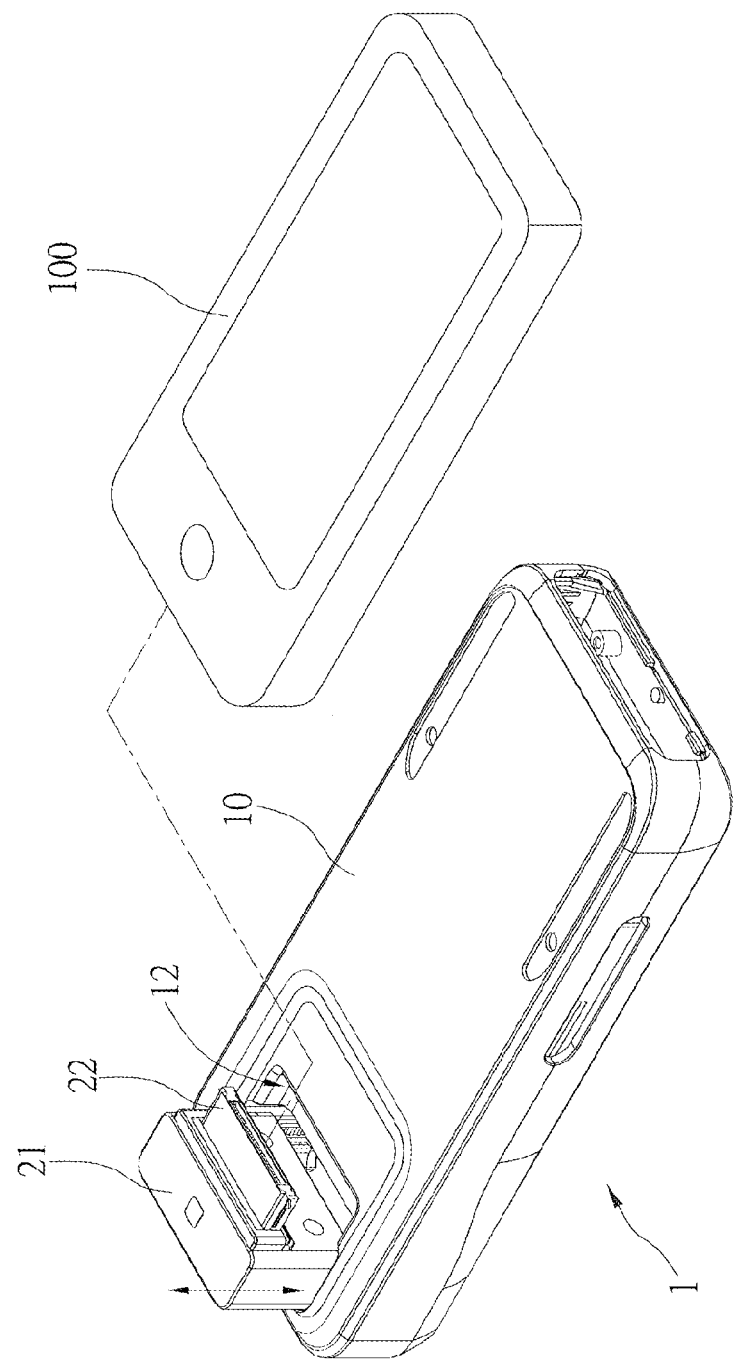
FIG. 3 is a perspective view of the first preferred embodiment of the present invention, showing the connector in the second position.

As shown in FIG. 1 to FIG. 3, a docking device 1 of the first preferred embodiment of the present invention is used to connect an electronic device 100. In the embodiment, the electronic device is a smart phone, and it also may be a tablet, a laptop, or other devices which needs to charge, transmit data, or output image. In the embodiment, the docking device 1 includes a base 10 and a connector 20, and the connector 20 is provided on the base 10 to move in a predetermined path.

The base 10 has a slot 12 and a pair of rails 14 on opposite sidewalls of the slot 12.

The connector 20 has a body 21, a connecting port 22 on the body 21, and a pair of guiding members 24. The guiding members 24 are a pair of bend rods on left and right sides of the body 21 to respectively engage the rails 14 so that the body 21 is received in the slot 12 of the base 10. Consequently, the body 21 may be moved along the rails 14 between a first position (FIG. 2) and a second position (FIG. 3). As shown in FIG. 2 and FIG. 3, when the body 21 arrives at the first position, the connecting port 22 is in the slot 12 of the base 10. The connecting port 22 leaves the slot 12 to connect the electronic device 100 when the body 21 is moved to the second position.

The present invention will not have the cable problem as described above because the connecting port 22 is integrated into the base 10. The connector 20 is movably mounted on the base 10 and may be received in the base 10 that may be greatly enhance the portability and operation of the docking device 1.

Figure 4:
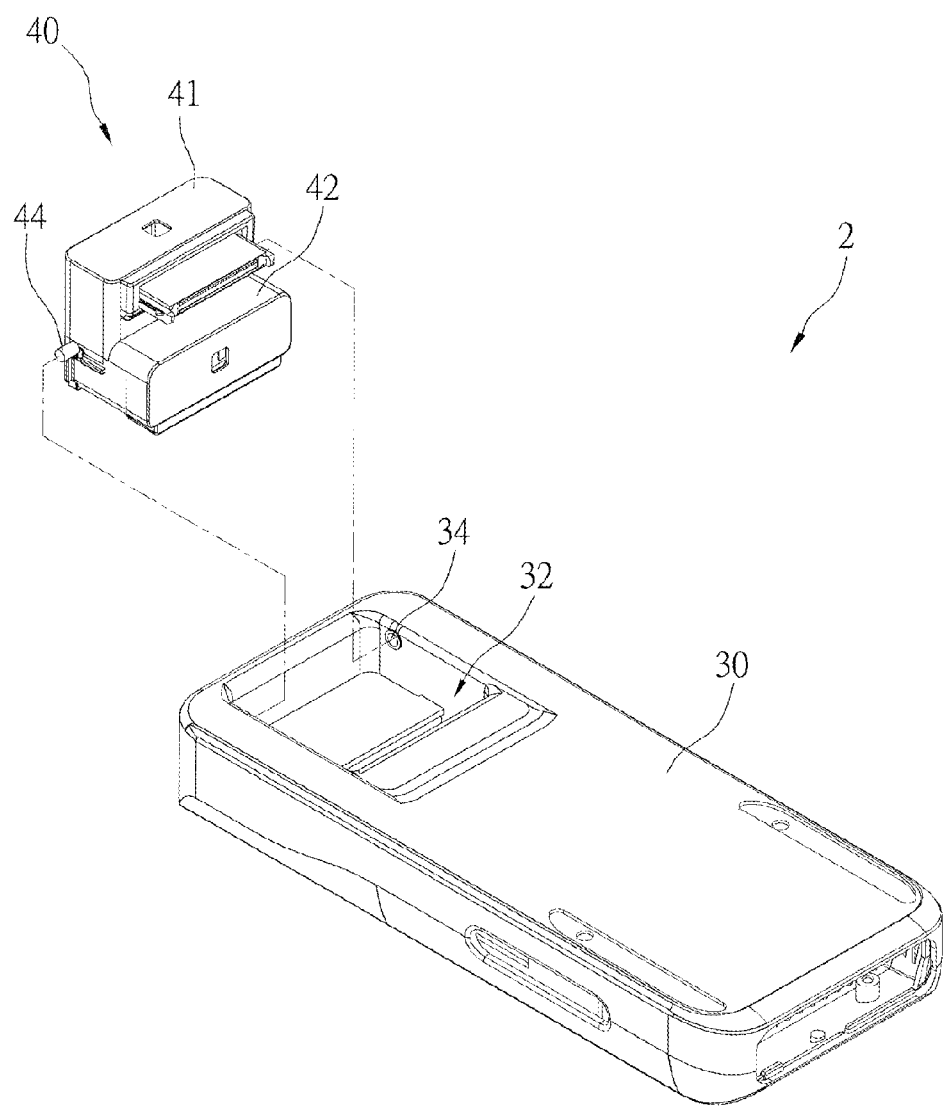
FIG. 4 is a perspective view of a second preferred embodiment of the present invention.

As shown in FIG. 4, a docking device 2 of the second preferred embodiment of the present invention, which is similar to above embodiment, has a base 30 and a connector 40, and the connector 40 is pivoted on the base 30.

Figure 5:
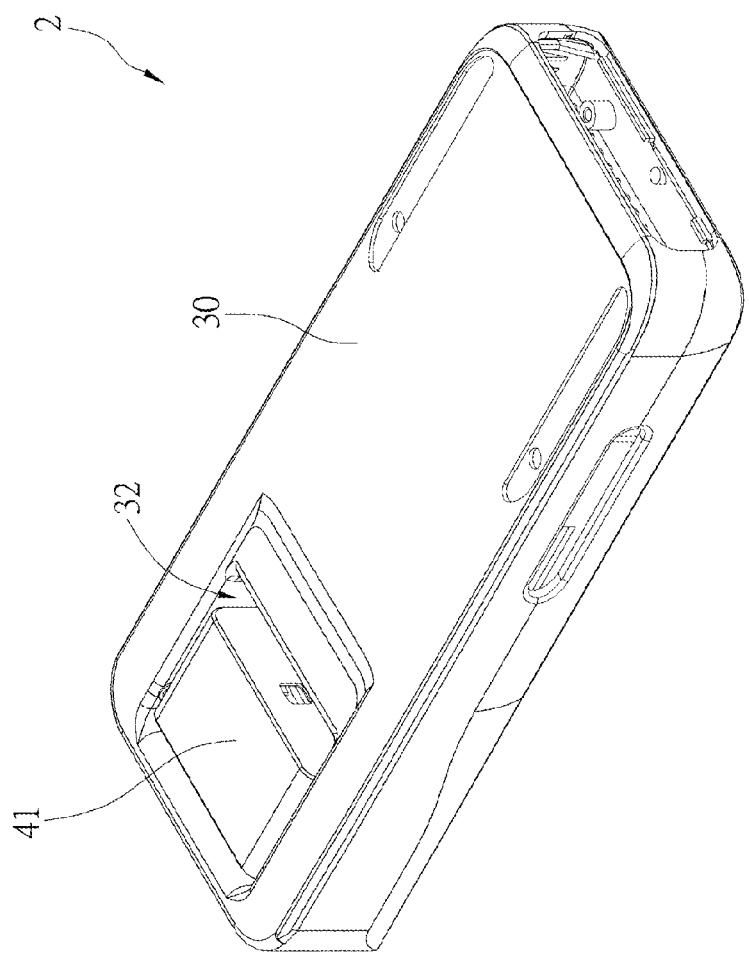
FIG. 5 is a perspective view of the second preferred embodiment of the present invention, showing the connector in the first position.
Figure 6:
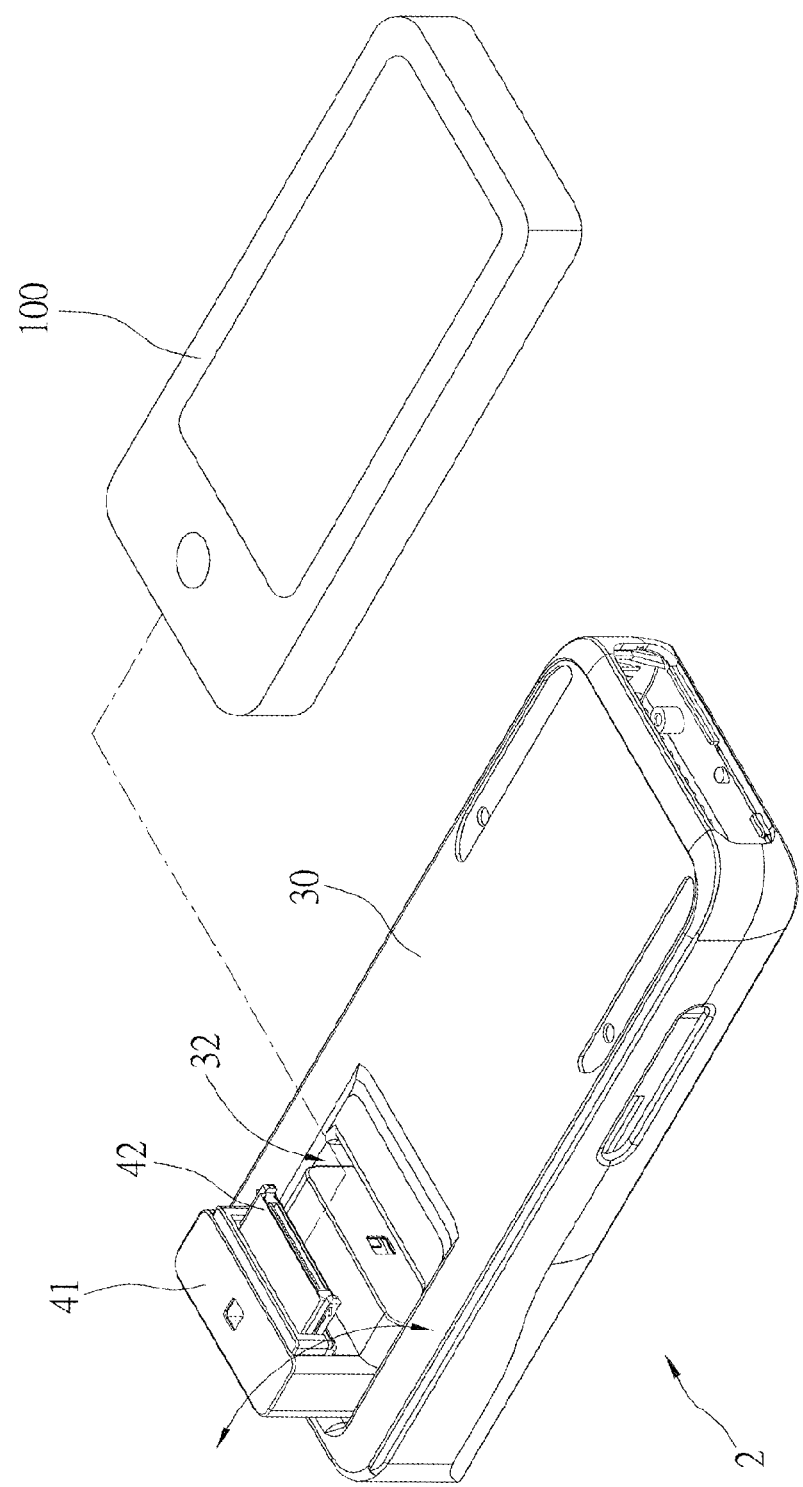
FIG. 6 is a perspective view of the second preferred embodiment of the present invention, showing the connector in the second position.

The base 30 has a slot 32. The connector 40 has a body 41 and a connecting port 42 on the body 41. The different parts are that the base 10 has two openings 34 on opposite sidewalls of the slot 32, and the connector 40 has a pair of rods 44 inserted into the opening 34 of the base 30 so that the body 41 of the connector 40 is rotated between a first position (FIG. 5)

and a second position (FIG. 6). It is clearly shown in FIG. 5 and FIG. 6, in the first position the connecting port 42 is hidden in the slot 32 for storage and portable, and in the second position the connecting port 42 leaves the slots 32 to connect the electronic device 100.

It is noted that the detailed description and technical contents of the present invention will be explained with reference to the accompanying drawings. However, the drawings and description are illustrative only but not used to limit the present invention. Except for the designs as described above, any other design which is directly integrated with the connecting port and may be movably received in the base is still in the scope of the present invention.

Figure 7:
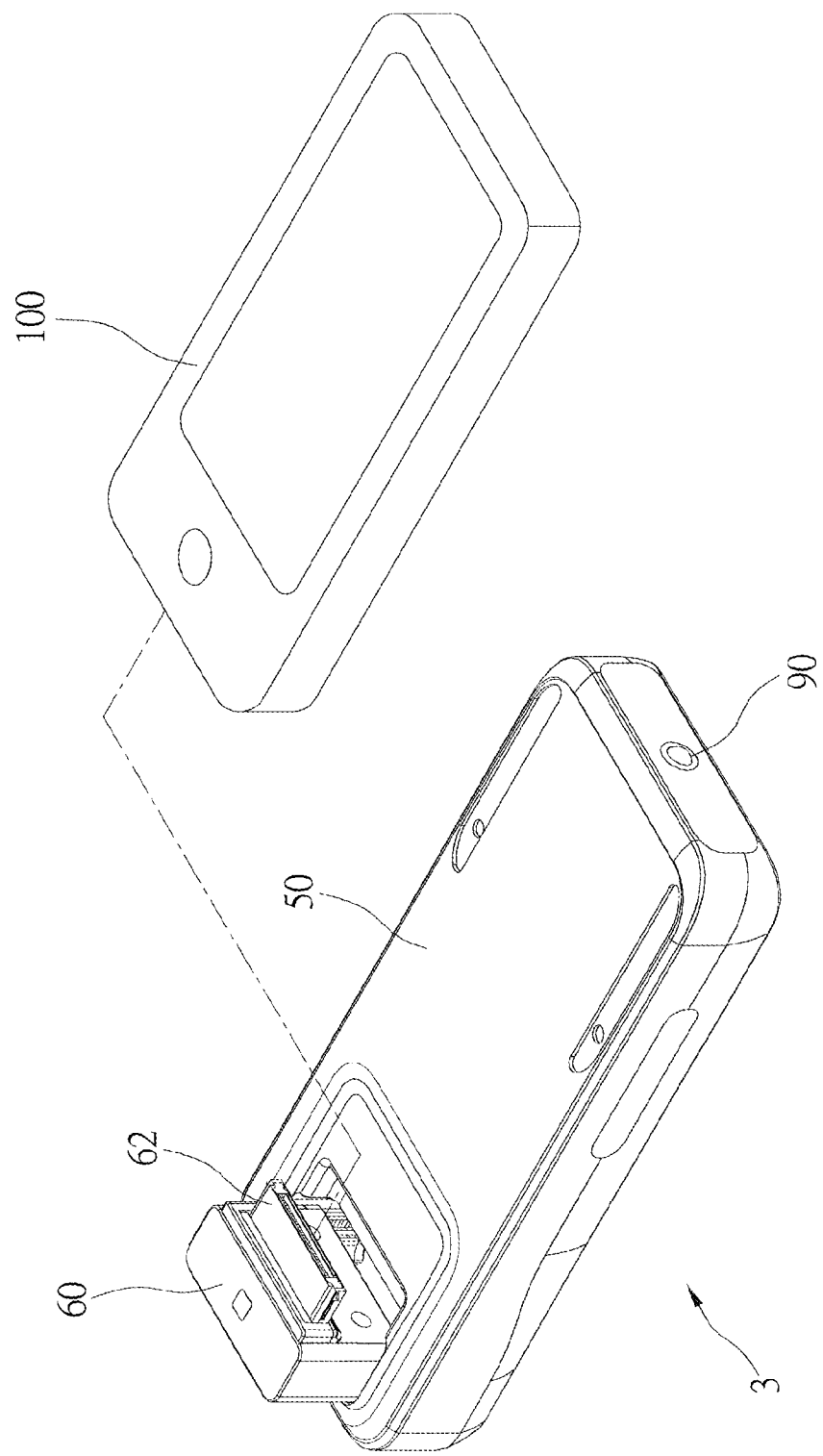
FIG. 7 is a perspective view of the portable projector of the present invention.
Figure 8:
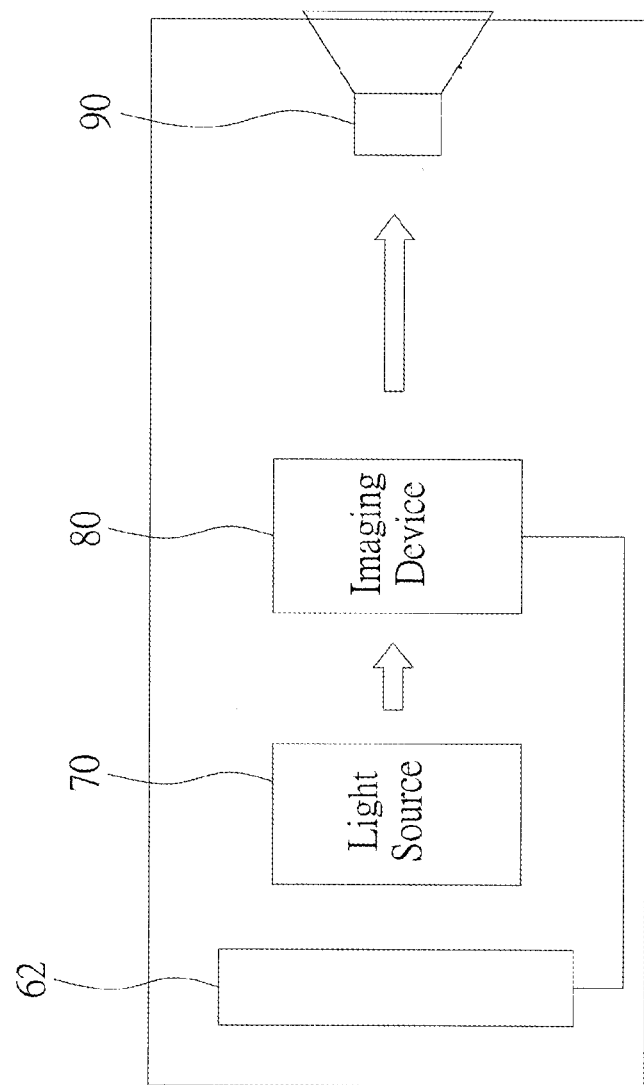
FIG. 8 is a block diagram of the portable projector of the present invention.

Besides, the present invention further provides a portable projector equipped with the docking device as described above. As shown in FIG. 7, a portable projector 3 of the present invention may receive image signals from the electronic device 100 and project images on a screen (not shown). The portable projector 3 has a base 50 and a connector 60, which are the same as the docking device 1 of the first preferred embodiment. As shown in FIG. 8, the portable projector 3 has a projection module electrically connected to a connecting port 62 of the connector 60. The electronic device 100 connects the connecting port 62 to transmit image signals to the projection module, and then the projection module project images on the screen according to the image signals. The projection module includes a light source 70, an imaging device 80 and a lens 90.

The light source 70 is provided in the base 50 to emit light. In the embodiment, the light source 70 is a LED array, and it also may be a white light bulb, a RGB light bulb, or other equivalent light sources.

The imaging device 80 is provided in the base 50. The imaging device 80 is at a position where may receive the light of the light source 70. The imaging device 80 is electrically connected to the connecting port 62 to receive the image signals of the electronic device 100 and project images on the screen according to the image signals. In the embodiment, the imaging device 80 transform the light from the light source 70 into image light by digital micromirror device (DMD). Except DMD, liquid crystal panel, or other equivalent devices may be used for the imaging device 80.

The lens 90 is provided on the base 50 to focus the image light from the image device 80 on the screen and form a corresponding image.

With the design of the present invention, it may enhance the portability and operation of the portable projector 3 without the cable problem as described above.

It is noted that the portable projector 3 use the docking device 1 of the first embodiment, and it may use the docking device 2 of the second embodiment as well. It may use any other design which is directly integrated with the connecting port and may be movably received in the base to achieve the same purpose.

The description above is a few preferred embodiments of the present invention. In practice, the docking device may be incorporated in a variety of devices, such as power bank, data transmission device, and other equivalent devices. The equivalence of the present invention is still in the scope of claim construction of the present invention.

What is claimed is:

1. A docking device for connecting an electronic device, comprising:
    a base;
    a connector having a body and a connecting port on the base, wherein the body is provided on the base to be moved between a first position and a second position; the connecting port is hidden in the base when the body is moved to the first position; and the connecting port is exposed to connect the electronic device when the body is moved to the second position; and
    wherein the base has a pair of rails, and the body has a pair of guiding members to engage the rails so that the body reciprocates along the rail between the first position and the second position.

2. The docking device as defined in claim 1, wherein the base has a slot; the connecting port is received in the slot when the body is moved to the first position, and the connecting port leaves the slot when the body is moved to the second position.

3. The docking device as defined in claim 1, wherein the body reciprocates in a predetermined path between the first position and the second position.

4. A portable projector, which receives image signals from an electronic device to project images on a screen, comprising:
    a base;
    a connector having a body and a connecting port on the base, wherein the body is provided on the base to be moved between a first position and a second position; the connecting port is hidden in the base when the body is moved to the first position; and the connecting port is exposed to connect the electronic device when the body is moved to the second position;
    a projection module provided in the base and electrically connected to the connecting port to receive the image signals of the electronic device through the connecting port and project images on the screen consequently; and
    wherein the base has a pair of rails, and the body has a pair of guiding members to engage the rails so that the body reciprocates along the rail between the first position and the second position.

5. The portable projector as defined in claim 4, wherein the projection module includes a light source, an image device, and a lens; the light source is provided in the base to emit light; the image device is provided in the base; the image device is provided at a position where the image device receives the light of the light source; the image device is electrically connected to the connecting port to receive the image signals of the electronic device and generate image light consequently; the lens is provided on the base to focus the image light on the screen to form a corresponding image.

6. The portable projector as defined in claim 4, wherein the base has a slot; the connecting port is received in the slot when the body is moved to the first position, and the connecting port leaves the slot when the body is moved to the second position.

7. The portable projector as defined in claim 4, wherein the body reciprocates in a predetermined path between the first position and the second position.

* * * * *